Oct. 31, 1950  G. SLAYTER  2,528,091
RESILIENT GLASS FIBER MAT
Filed Aug. 13, 1945
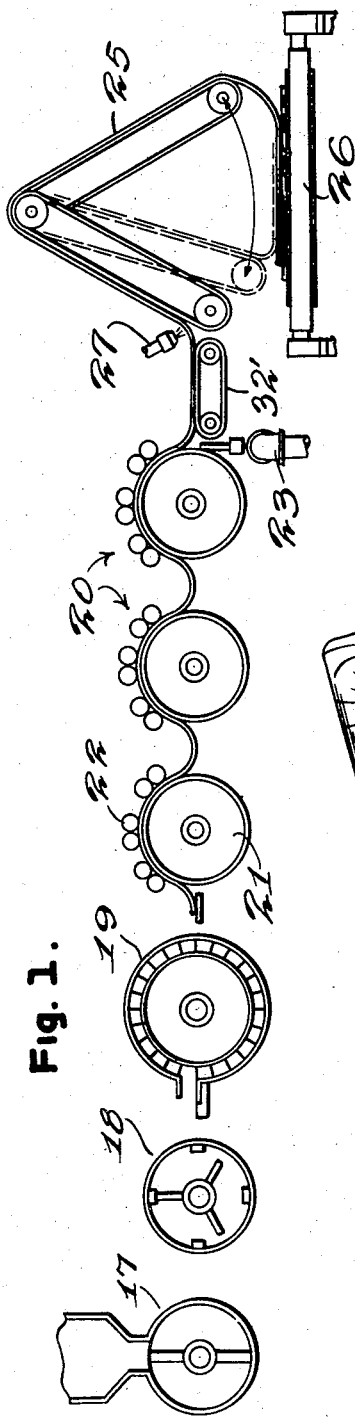
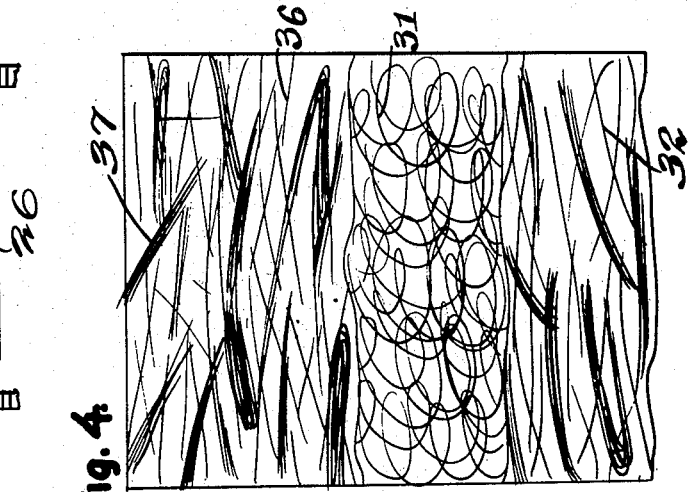
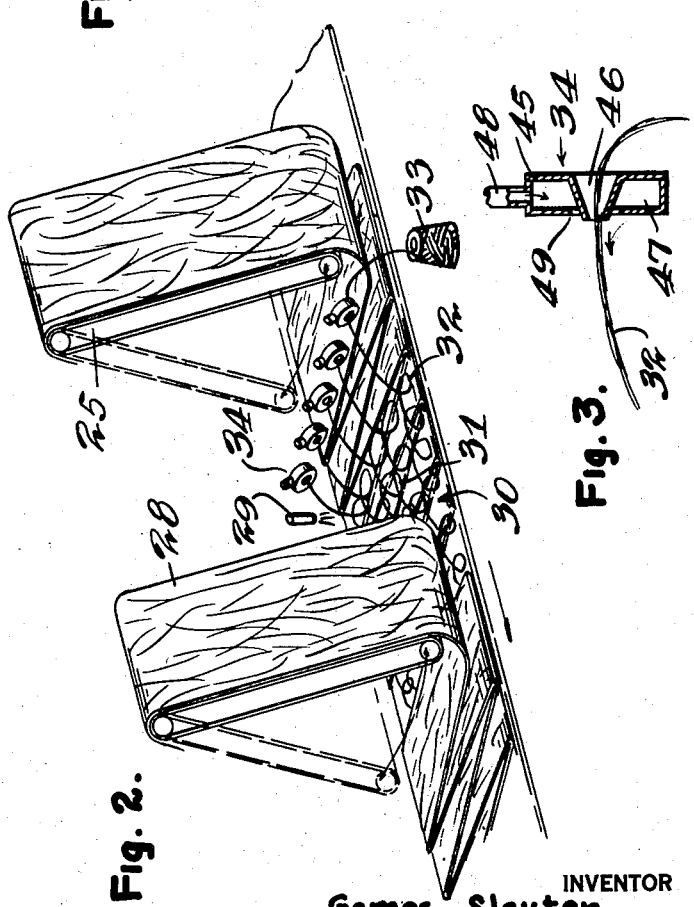
INVENTOR
Games Slayter
BY
ATTORNEYS Patented Oct. 31, 1950

2,528,091

UNITED STATES PATENT OFFICE 2,528,091

RESILIENT GLASS FIBER MAT

Games Slayter, Newark, Ohio, assignor to Owens-Corning Fiberglas Corporation, a corporation of Delaware Application August 13, 1945, Serial No. 610,626

3 Claims. (Cl. 154—54)

This invention relates generally to the manufacture of glass fiber products and refers more particularly to the production of mats of interbonded glass fibers.

Mats of fine glass fibers may be produced from glass fiber strands and yarns, both the strands and yarns being the waste or scrap resulting from the manufacture of strands, yarns, cloth and other textile products.

The strands and yarns are converted to a resilient fluffy web by a combination of chopping, picking, and carding processes selected to obtain the particular type of product desired. The carding is ordinarily the last of these three steps and the fibers are delivered from the card in a thin filmy web of fibers and partially opened strands and yarns all interlaced.

In forming mats of substantial thickness this web is fed by suitable means such as a lapper onto a traveling belt in such a manner that the web is laid back and forth over the belt, usually in directions crosswise of the belt travel, so that the web is superposed on itself to build up a mat of the desired thickness. Prior to superposing the web on itself or coincidentally therewith, a suitable bonding agent is usually applied to the fibrous glass and is cured or set up by subjecting the mat to heat.

Mats fabricated in accordance with the above may be used wherever a light weight material having excellent acoustic and thermal insulating properties is required. Also, it is useful as a reinforcement for resinous materials, and by judicious orientation of the fibers during the mat forming operation, it is possible to impart added strength to the mat in selected directions for enhancing its reinforcing properties.

A mat processed in the manner briefly described above possesses favorable tensile strength in a direction coinciding with the predominant direction of the fibers. Due to the manner of making the mat, the majority of the fibers extend predominantly lengthwise of the web and usually, due to the lapping operation, crosswise of the mat. The tensile strength of the mat in the crosswise direction is relatively high while the tensile strength in the general direction of length of the mat is relatively low. As a result, difficulty is sometimes encountered in handling long lengths of the mat during fabrication, especially where the mat is impregnated with a liquid resin or a resin solution and its weight thus increased appreciably.

One of the principal objects of this invention is to improve mats of the general type just described. This is accomplished by incorporating a reinforcement in the mat which greatly strengthens the mat in the direction of its length and also in angularly related directions. The mat of the present invention may be employed as a reinforcement for resinous or plastic materials requiring high tensile strength in practically all directions, and handling the mat during fabrication is facilitated as long lengths of mat may be drawn through treating zones without the danger of breaking or tearing the mat.

Another object of this invention is to provide a mat of improved strength without adding greatly to the weight, thickness or density of the mat and without detracting from the thermal or acoustic insulating properties of the mat. The invention achieves this by arranging reinforcement interjacent the superposed webs of fibrous glass, the reinforcement being in the form of a relatively thin web of substantially continuous glass fibers, strands or yarns in particular arrangement. In instances where the superposed webs are laid crosswise of the direction of belt travel to form the mat, the continuous glass fibers may be laid between the webs with the fibers extending in the general direction of length of the mat so as to cooperate with the cross fibers or strands in the superposed webs to effectively reinforce the mat in two directions extending transverse to each other.

Still another object of this invention is to provide a reinforcing web of continuous fibers or strands effective to reinforce the superposed webs in all directions. For this purpose the fibers or strands may be disposed in a multiplicity of loops spaced from each other in the direction of length of the strands and having portions of each loop overlapping the next adjacent loops. These overlapping portions are secured together by the binding agent in the mat so that the reinforcing web not only imparts substantial tensile strength to the mat in directions extending generally longitudinally of the mat where an increase in strength is usually required but, in addition, reinforces the mat in practically all directions parallel to the major faces of the mat.

The foregoing as well as other objects will be made more apparent as this description proceeds, especially when considered in connection with the accompanying drawing, wherein:

Figure 1 is a diagrammatic illustration of one type of equipment for producing glass fibrous mats of the general character to which this invention pertains;

Figure 2 is a schematic illustration of the process for making glass fibrous mats in accordance with this invention;

Figure 3 is a sectional view illustrating a part of the apparatus employed in carrying out the process shown in Figure 2; and Figure 4 is an enlarged view of a portion of a mat made in accordance with this invention, partly broken away, and showing the approximate disposition of the fibers in a schematic fashion.

The present invention is shown in connection with a glass fibrous mat of the general type illustrated and described in the Richard M. Roberts et al. application Serial Number 550,114, filed August 18, 1944, now Patent No. 2,477,555. Briefly, the mat is preferably produced from glass fibers collected in the form of strands, although yarns of one or more strands of fine glass fibers twisted and plied may also be employed. Where yarns are used, they are preferably employed in conjunction with a substantial proportion of fibers in the form of strands. Both the strands and yarns may be the waste or scrap resulting from the manufacture of glass fiber strands, yarns, cloth and other textile products.

There are various different ways of producing glass fibers and the present invention is not restricted to any one particular process. However, one process which has acquired considerable recognition in the art consists in flowing a plurality of streams of molten glass and attenuating these streams by means of a drum or spool onto which the resulting fibers are wound to form a package. The fibers made by this process are of relatively great length and are commonly referred to in the art as continuous fibers.

Another process for manufacturing glass fibers consists in attenuating the streams of molten glass by a gaseous blast of air or steam and the fibers formed in this manner are collected in a thin web which is drafted out into a sliver. In the drafting operation, the substantially continuous fibers are broken up into shorter lengths to form what is commonly known in the art as staple fibers.

Both of these processes result in the production of glass fiber strands which contain hundreds of fibers lying in substantial parallel relationship in the strand. In the continuous fiber strand, the fibers are held together in strand form by means of a binding material, such for example, as a starch product applied to the fibers at the point at which they are collected into a strand. Ordinarily, no binding material is required in the case of strands formed of staple glass fibers, because there is a certain amount of interfelting of these shorter fibers providing sufficient integrity to maintain the fibers in sliver form.

The invention embraces strands and yarns made by either process, but for the reinforcing web previously mentioned, continuous fiber strands are preferred.

In the manufacture of yarns from the strands or slivers made by the continuous fiber process or the staple fiber process, difficulty is sometimes experienced in completely unwinding all of the strands from the package in which they are collected in the manufacturing process, and a portion of the package must be discarded as far as its processing into yarns is concerned. Such discarded portions of packages are an economical source of material for manufacture of the present mats, but of course, other sources of fibers, yarns, and strands may be used if desired. Further, while the present disclosure relates principally to mats made from glass fiber yarns and strands, it is effective to reinforce glass fiber mats made in other ways.

In the manufacture of mats from glass fiber yarns and strands, the yarns or strands, usually in the form of compact bundles or masses, are converted to a resilient fluffy mat by treating them to separate and loosen them and to separate and loosen the fibers of a certain proportion of the individual strands. This separating and loosening may be accomplished by a selected combination of chopping, picking and carding processes. The particular processes employed and the order in which these processes are used is selected to obtain the particular type of product desired.

For the purpose of illustrating this process, it will be assumed that a mass of fibrous glass in the form of yarns or strands is first fed into a conventional chopper, represented schematically by the reference character 17 in Figure 1 of the drawing. The chopper cuts up and breaks open the compact mass of fibrous glass and severs the strands and fibers to shorter lengths. The fibrous material may be fed through the chopper several times, depending upon the degree to which it is desired to reduce the length of the fibers. It has been found that a fiber length of an average of about one and one-half to three inches is satisfactory for the further processing of the fibers into a uniform mat.

The chopped fibers delivered by the chopper 17 are introduced to a conventional "beater" type picker indicated in Figure 1 of the drawing by the reference character 18. The picker is provided with beaters and coacting blades which break open the compact mass of fibrous material and separate the mass into a flocculent condition of rather high density. It will, of course, be understood that the material may be repeatedly fed into the picker to obtain a fibrous material of lighter density.

From the picker 18, the material is fed into a second picker of the so-called "shredder" type indicated in the drawings by the reference character 19. This type of picker is provided with a drum having closely spaced teeth projecting from its periphery, which tear apart the fibrous material and serve to separate the mass into individual fibers. The extent of this separating action may be governed by the number of times the fibrous material is passed through the picker 19.

Instead of the picker 19 or in conjunction therewith, a device 20 of the Garnett machine type may be employed to further open or fluff the fibrous glass and to arrange it in the form of a continuous web. As the fibers pass through the Garnett machine, they are drawn by large rolls 21 between pins or teeth on relatively smaller rolls 22 of the Garnett machine. Inasmuch as the teeth move in opposite directions or at different speeds than the rate of travel of the fibrous material, the fibers are drawn apart and rearranged by a combing action into a uniform, more or less haphazard, disposition, but with the fibers extending predominantly in the general direction of travel of the mat through the Garnett machine. The degree of this orienting of the fibers and strands, as well as the proportion of the unopened or incompletely opened strands, may be varied by regulating the rate or direction of movement of the teeth of the Garnett machine rolls 22 relative to the rolls 21. The greater relative movement between the two sets of rolls provides a greater combing action and hence a higher degree of opening of the strands is assured.

The number of times the fibrous glass is passed through either one, two or all of the opening and picking devices is determined by the properties desired in the finished mat. If a very low density mat of fluffy material is required, the fibrous glass is usually passed through the first and second pickers about one to four times each and once or twice through the Garnett. As before mentioned, the second picker may be dispensed with in favor of the Garnett machine.

Passage of the fibrous glass through the first type of picker tends to separate the strands from each other and passage through the second type of picker further separate the strands and separate the fibers in the individual strand. The Garnett machine performs a similar operation and in addition arranges the fibers into a web. By judicious selection of the number of times the fibrous glass is passed through one or both of the pickers a mat may be made in which a substantial proportion of the fibers remain arranged in the form of strands. The retention of the fibers in strand form may be aided by applying a binding material to the strand before the strands are fed through the pickers to limit the degree to which the strands are separated into individual fibers. One example of such a binding material is dextrinized starch applied to the strands and then heated to a temperature of about 200° C. for an hour or two to convert the starch to a rigid bonding substance, which tends to prevent separation of the strands into fibers when the strands are treated in the manner described.

As a result of this incomplete opening of the strands there are distributed throughout a mass of haphazardly arranged fibers a large number of bundles of fibers, the hundreds of fibers in the individual bundles being arranged in parallel and compact relation. This distribution of the fibers is shown in Figure 4, the fully dispersed fibers being represented at 36 and the bundles being shown at 37. The bundles and the fibers extend predominantly in the direction of length of the web which is the direction of passage of the web through the Garnett machine. Due to this arrangement the web has greater strength in this direction than in the direction of width of the web.

The number and average diameter of bundles of fibers in the mat may be varied depending upon the properties desired in the mat, relatively few bundles being desired when the mat is used for acoustic or thermal insulation while a larger number of larger average size bundles are preferred when the mat is employed as cushioning material or as plastic reinforcement.

By the application of relatively small amounts of binding material to the web, the fibers in the bundles are held together and the bundles are secured to each other and to the fibers in the mat mainly at spaced apart points such as the points of juncture of the strands and fibers and are not encased and completely impregnated with the rigid binding material. Consequently the bundles have substantially the same flexibility as the individual fibers that make up the bundles but have a resistance to flexure approximately equal to the sums of the resistances of all the fibers in the bundle. The structure is analogous to a leaf spring.

This provides a highly resilient fibrous glass mat but one also having additional resistance to compression so that the mat is not only suited for thermal and acoustic insulation, but is also useful as a padding or cushioning material. The resistance to compression may be increased by decreasing the degree of opening of the yarns and strands so that more of the fibers are present in bundles, or by applying more binding material in order to more fully impregnate the bundles, or both the proportion of unopened strands or bundles and the quantity of binder may be increased. With larger amounts of binder the bundles are stiffened, with the maximum stiffness of the bundles being obtained when the bundles are substantially entirely impregnated and encased with the binding material.

The fibers delivered by the Garnett machine are in the form of a loose web of glass fibers and this web is fed by suitable means, such as a conventional lapper 25, onto a traveling belt 26. The web is laid back and forth over the belt in directions crosswise of the travel of the belt so that the web is superposed on itself to build up a mat of the desired thickness. As the web of fibrous glass is delivered from the Garnett machine, a bonding material of any suitable type is applied to the web. Preferably, the bonding agent is made up of an aqueous solution of "A" stage phenol formaldehyde alone or admixed as by emulsification with a lubricant such as petroleum oil. The binding material may be applied by means of spray guns 27 directed onto the web either at the point at which it moves into the lapper 25 or at the point where the web is distributed onto the belt 32' by means of a spray head 23. The amount of binding material applied to the web is ordinarily in amounts sufficient to provide about five per cent to twenty per cent of resin and lubricant by weight of the fibrous glass. Other binders well known in the art may be used instead of phenol formaldehyde.

The thickness of the sheets resulting from the above process may be increased by forming the mat with two or more superposed webs. Assuming for the purpose of illustration that it is desired to form a mat of two webs superposed, this may be accomplished by merely duplicating the web forming equipment previously described and positioning this equipment so that the second web is fed onto the belt 26 in superposed relation to the first web by a second lapper 28, shown in Figure 2 of the drawings. The lapper 28 lays the second web back and forth over the first web in directions crosswise of the direction of belt travel in the same manner previously described in connection with the first web. A bonding agent may be applied to the top surface of the first web prior to superposing the second web over the same. This bonding agent is preferably the same as the bonding agent previously mentioned and may be applied on the top surface of the first web by spray guns 29 located between the two lappers.

A mat processed in accordance with the foregoing possesses substantial tensile strength in transverse directions, because the majority of the glass fibers are oriented to extend predominantly crosswise of the belt 26. While this strength in one direction is a very important characteristic for certain uses of the mat, it is often desired to provide the mat with high tensile strength in all directions. For accomplishing this result, the mat is reinforced by a thin web 30 formed of strands of continuous glass fibers and interposed between the two webs. As shown in the enlarged view, Figure 4 of the drawings, the strands 31 of continuous glass extend in the general direction of the length of the mat, but each is provided with a series of loops 32 throughout the length thereof. The loops of adjacent strands overlap each other and form the web-like structure 30. This web not only greatly increases the tensile strength of the mat in the general direction of its length, but in addition, imparts substantial tensile strength to the mat in practically all directions parallel to the surfaces or faces of the mat.

The substantially continuous fibers making up the reinforcing web 30 are in the form of strands or yarns and may be supplied from conventional wound packages 33 of yarn or strand. The strands or yarns from the packages are laid on the top surface of the bottom fibrous glass web by a plurality of tangential or circular type blowers 34 suitably supported between the lappers 25 and 28 above the belt 26. Briefly, each blower 34 comprises a part 45 having a central portion 46 apertured to receive a strand or yarn from one of the packages 33 and having an annular chamber 47 surrounding the portion 46. The chamber 47 is connected to a source of air under pressure by a conduit 48 and has an annular discharge port 49 surrounding the delivery end of the portion 46.

Blowers of this type when drawing strands from wound packages over the ends thereof as herein disclosed tend to deposit the strands on a moving surface in a series of loops. The blowers are so spaced that the loops of one strand or yarn overlap the strand or yarn discharged by an adjacent blower. Adjacent strands or yarns are secured together and to the top surface of the web laid down on the belt by the binder applied by the spray guns 29. The lapper 28 then lays a second web over the first web and the resulting mat is fed through an ordinary oven to heat the mat and dry, cure or set up the binder. Conventional means may be employed to hold the mat to the desired thickness while the binder is being set, if desired.

Instead of applying the reinforcing web between two layers of the mat, it may be applied to one side of a single-layer or multi-layer mat and be bonded thereto by the resin binder. In the present embodiment, this could be accomplished by depositing the strands for the web 30 onto a mat after it has passed the lapper station or stations.

The invention provides an integral mat embodying a reinforcing web, which not only substantially increases the tensile strength of the mat in the general direction of its length, but also provides high tensile strength in practically all directions parallel to the major surfaces of the mat. This feature enables pulling long lengths of the mat through heating chambers or coating baths without the danger of distorting or otherwise injuring the mat. Moreover, it enables the use of a relatively low density mat in products requiring high tensile strength in various different directions. For example, the mat may be successfully used as a backing composition surface for surface coverings such as linoleum and as a reinforcement for resinous or plastic materials. The fibrous mat may be incorporated in a body of plastic by impregnating the mat with the selected resinous material and then in the conventional way curing or setting the resin. The resulting product is a continuous resinous body having high strength characteristics in practically all directions parallel to the major surfaces of the product.

I claim:

1. As a product of manufacture, a mat comprising a pair of webs of haphazardly arranged glass fibers each folded back and forth upon itself and disposed in superpose relation, a reinforcing web of substantially continuous glass fiber strands in which the fibers extend continuously throughout the length of the strands buried between said webs, said strands being in the form of interconnected substantially closed coils irregularly disposed in overlapping relation in a plane parallel to the major faces of said first-named webs and arranged substantially in rows extending lengthwise of the mat, the coils of each row overlapping the coils of adjacent rows, said strands being continuous throughout the length of the mat, and a bonding material distributed throughout the mat and holding said webs in integral relation.

2. As a product of manufacture, a mat comprising a pair of webs of fine discontinuous glass fibers each folded back and forth upon itself and arranged in superposed relation, a reinforcing web of substantially continuous integral unopened strands of glass fibers of continuous type buried between the webs aforesaid in the form of an irregularly looped pattern disposed in a plane parallel to the major faces of said first named webs and arranged substantially in rows extending lengthwise of the mat, said rows of loops overlapping one another, and a bonding material distributed throughout the mat and holding said webs in integral relation.

3. As a product of manufacture, a mat comprising a plurality of folded webs of haphazardly arranged discontinuous glass fibers in which the fibers extend predominantly in a direction transverse to the length of the mat, unopened strands of glass fibers of continuous length interspersed between and reinforcing the webs aforesaid and extending lengthwise of said mat, said strands forming a substantially irregular pattern in which the strands are disposed in overlapping looped relation in a plane parallel to the major faces of said first-named webs, said pattern arranged substantially in rows extending lengthwise of the mat with the loops of each row intermingling with the loops of adjacent rows, and a bonding material distributed throughout the mat and holding said webs in integral relation.

GAMES SLAYTER.

REFERENCES CITED

The following references are of record in the file of this patent:

UNITED STATES PATENTS

| Number | Name | Date |
|---|---|---|
| 197,502 | Turner | Nov. 27, 1877 |
| 1,108,354 | Fowler | Aug. 25, 1914 |
| 1,804,254 | Frederick | May 5, 1931 |
| 1,834,556 | Toles | Dec. 1, 1931 |
| 1,881,932 | Powell | Oct. 11, 1932 |
| 1,988,843 | Heldenbrand | Jan. 22, 1935 |
| 2,146,870 | Whiteley | Feb. 14, 1939 |
| 2,184,326 | Thomas | Dec. 26, 1939 |
| 2,306,781 | Francis | Dec. 29, 1942 |
| 2,308,849 | Young | Jan. 19, 1943 |
| 2,338,839 | Cass | Jan. 11, 1944 |
| 2,377,317 | Blume | June 9, 1945 |
| 2,381,184 | Ripley | Aug. 7, 1945 |
| 2,392,882 | Roberts | Jan. 15, 1946 |
| 2,477,555 | Roberts | July 26, 1949 |

FOREIGN PATENTS

| Number | Country | Date |
|---|---|---|
| 17,549 | Great Britain | Aug. 15, 1898 |
| 447,298 | France | Dec. 28, 1912 |
| 89,787 | Sweden | July 20, 1937 |